(12) United States Patent
Lee et al.

(10) Patent No.: US 8,537,328 B2
(45) Date of Patent: Sep. 17, 2013

(54) LIQUID CRYSTAL DISPLAY DEVICE AND METHOD OF MANUFACTURING THE SAME

(75) Inventors: Seung-Kyu Lee, Yongin (KR);
Dong-Wook Kim, Yongin (KR);
Chul-Ho Kim, Yongin (KR);
Dong-Hoon Lee, Yongin (KR)

(73) Assignee: Samsung Display Co., Ltd. (KR)

( * ) Notice: Subject to any disclaimer, the term of this patent is extended or adjusted under 35 U.S.C. 154(b) by 262 days.

(21) Appl. No.: 13/069,277

(22) Filed: Mar. 22, 2011

(65) Prior Publication Data
US 2011/0228207 A1  Sep. 22, 2011

(30) Foreign Application Priority Data

Mar. 22, 2010  (KR) ................. 10-2010-0025306

(51) Int. Cl.
*G02F 1/13* (2006.01)
*G02F 1/1339* (2006.01)
(52) U.S. Cl.
USPC ............ 349/192; 349/155; 349/156; 349/187
(58) Field of Classification Search
None
See application file for complete search history.

(56) References Cited

U.S. PATENT DOCUMENTS

| | | | | |
|---|---|---|---|---|
| 5,930,607 | A * | 7/1999 | Satou | 438/158 |
| 6,010,384 | A * | 1/2000 | Nishino et al. | 445/24 |
| 6,266,109 | B1 * | 7/2001 | Yamaguchi et al. | 349/86 |
| 6,710,843 | B2 * | 3/2004 | Choo et al. | 349/187 |
| 6,989,879 | B1 | 1/2006 | Nakahara et al. | |
| 7,138,030 | B2 * | 11/2006 | Choo et al. | 156/272.8 |
| 7,605,901 | B2 * | 10/2009 | Yoshino et al. | 349/153 |
| 8,325,319 | B2 * | 12/2012 | Ikeguchi | 349/190 |
| 2002/0075438 | A1 * | 6/2002 | Takase | 349/149 |
| 2002/0191145 | A1 * | 12/2002 | Choo et al. | 349/187 |
| 2003/0231277 | A1 * | 12/2003 | Zhang | 349/187 |
| 2004/0100609 | A1 * | 5/2004 | Choo et al. | 349/187 |
| 2004/0150766 | A1 * | 8/2004 | Choo et al. | 349/73 |
| 2004/0227894 | A1 | 11/2004 | Kim et al. | |
| 2004/0257518 | A1 * | 12/2004 | Jang et al. | 349/155 |

(Continued)

FOREIGN PATENT DOCUMENTS

| JP | 2004-310105 | 11/2004 |
|---|---|---|
| JP | 2004004753 | 1/2008 |

(Continued)

OTHER PUBLICATIONS

Office Action dated Oct. 19, 2012 in Korean Patent Application No. 10-2012-0080805, which is a Divisional Application of the Korean Priority Application No. 10-2010-025306.
Korean Office Action dated Jun. 22, 2011 in Korean Priority Application No. 10-2010-0025306.

*Primary Examiner* — Rhonda Peace
(74) *Attorney, Agent, or Firm* — Knobbe Martens Olson & Bear LLP

(57) ABSTRACT

A liquid crystal display (LCD) device and a method of manufacturing the same are disclosed. The liquid crystal display device includes: a plurality of cell regions including a first substrate upon which a pixel electrode is formed, a second substrate upon which a common electrode is formed, and a liquid crystal layer interposed between the first substrate and the second substrate, and a cutting region formed between the plurality of cell regions, and including the first substrate and the second substrate extended from the plurality of cell regions, and at least one peripheral spacer interposed between the first substrate and the second substrate, where the peripheral spacer contacts at least one of the first and second substrates.

15 Claims, 7 Drawing Sheets

(56) References Cited

U.S. PATENT DOCUMENTS

| | | | |
|---|---|---|---|
| 2005/0134791 A1* | 6/2005 | Iwata et al. | 349/187 |
| 2005/0140882 A1* | 6/2005 | Park | 349/119 |
| 2006/0146273 A1* | 7/2006 | Jang | 349/187 |
| 2009/0086141 A1 | 4/2009 | Shoraku et al. | |
| 2010/0033662 A1 | 2/2010 | Lee et al. | |
| 2010/0053526 A1 | 3/2010 | Kye et al. | |
| 2010/0097560 A1* | 4/2010 | Ikeguchi | 349/155 |
| 2010/0283951 A1* | 11/2010 | Lee et al. | 349/124 |
| 2011/0228207 A1* | 9/2011 | Lee et al. | 349/155 |

FOREIGN PATENT DOCUMENTS

| | | |
|---|---|---|
| KR | 2004-0033414 | 4/2004 |
| KR | 1020060087724 | 8/2006 |
| KR | 102008-0011824 | 2/2008 |
| KR | 102009-0072391 | 7/2009 |
| KR | 1020100018908 | 2/2010 |
| KR | 1020100025317 | 3/2010 |
| WO | WO2007123244 | 1/2007 |

* cited by examiner

LIQUID CRYSTAL DISPLAY DEVICE AND METHOD OF MANUFACTURING THE SAME

CROSS-REFERENCE TO RELATED APPLICATIONS

This application claims the benefit of Korean Patent Application No. 10-2010-0025306, filed on Mar. 22, 2010, in the Korean Intellectual Property Office, the disclosure of which is incorporated herein in its entirety by reference.

BACKGROUND

1. Field

Embodiments of the present invention relate to a liquid crystal display (LCD) device and a method of manufacturing the same.

2. Description of the Related Technology

In general, a liquid crystal display (LCD) device includes a first substrate on which switching devices for driving pixel regions are disposed, a second substrate facing the first substrate, and a liquid crystal layer interposed between the first substrate and the second substrate. The LCD device displays an image according to a voltage applied to the liquid crystal layer, and light transmittance is controlled.

A Patterned Vertical Alignment (PVA) mode LCD device, which is a type of Vertical Alignment (VA) mode LCD device, has a structure in which a liquid crystal domain is formed in a manner that liquid crystal molecules are arrayed in different directions by using a patterned transparent electrode so that a viewing angle of an LCD is improved. Thus, in order to manufacture a PVA mode LCD device, a process for forming the patterned transparent electrode is generally necessary, thus increasing the number of processes for forming the LCD device. Misalignment of the first and second substrates during the assembly process may cause misalignment of patterns of pixel electrodes of the first substrate and patterns of common electrodes of the second substrate, and as a result, a normal liquid crystal domain may not be formed.

In order to increase the productivity of LCD devices, a mother substrate having a plurality of product cells formed thereon is generally manufactured first, and then the plurality of product cells are cut in product cell units, instead of manufacturing each product cell, e.g., a screen of a mobile phone. However, when the mother substrate having the plurality of product cells formed thereon is manufactured, a short may occur in a cutting region between the plurality of product cells. Although the cutting region to be cut at a later time does not have a liquid crystal layer, the cutting region does have a pixel electrode layer and a common electrode layer so that the short may occur if a pixel electrode and a common electrode contact when an electric field is applied thereto before the cutting region is cut. If the short occurs in the cutting region, product cells around the cutting region may have defects.

SUMMARY OF CERTAIN INVENTIVE ASPECTS

One or more embodiments of the present invention include a liquid crystal display (LCD) device and a method of manufacturing the LCD device, whereby a liquid crystal domain may be formed without forming a pattern in an electrode, and a possibility of a short in a cutting region may be reduced.

Additional aspects will be set forth in part in the description which follows and, in part, will be apparent from the description, or may be learned by practice of the presented embodiments.

One aspect is a liquid crystal display (LCD) device including: a plurality of cell regions including a first substrate upon which a pixel electrode is formed, a second substrate upon which a common electrode is formed, and a liquid crystal layer interposed between the first substrate and the second substrate, and a cutting region formed between the plurality of cell regions, and including the first substrate and the second substrate extended from the plurality of cell regions, and at least one peripheral spacer interposed between the first substrate and the second substrate, where the peripheral spacer contacts at least one of the first and second substrates.

Another aspect is a method of manufacturing a liquid crystal display (LCD) device, the method including: manufacturing a first substrate including a pixel electrode, manufacturing a second substrate including a common electrode facing the pixel electrode, forming a plurality of cell regions between the first substrate and the second substrate, where the plurality of cell regions are sealed by using a sealant, forming a cell spacer in each of the plurality of cell regions, forming a liquid crystal layer in the plurality of cell regions, and forming at least one peripheral spacer interposed between the first substrate and the second substrate, in a cutting region between the plurality of cell regions, where the at least one peripheral spacer contacts at least one of the first and second substrates.

BRIEF DESCRIPTION OF THE DRAWINGS

These and/or other aspects will become apparent and more readily appreciated from the following description of certain embodiments, taken in conjunction with the accompanying drawings of which.

DETAILED DESCRIPTION OF CERTAIN INVENTIVE EMBODIMENTS

Reference will now be made in detail to certain inventive embodiments, examples of which are illustrated in the accompanying drawings. As used herein, the term "and/or" includes any and all combinations of one or more of the associated listed items.

Figure 1:
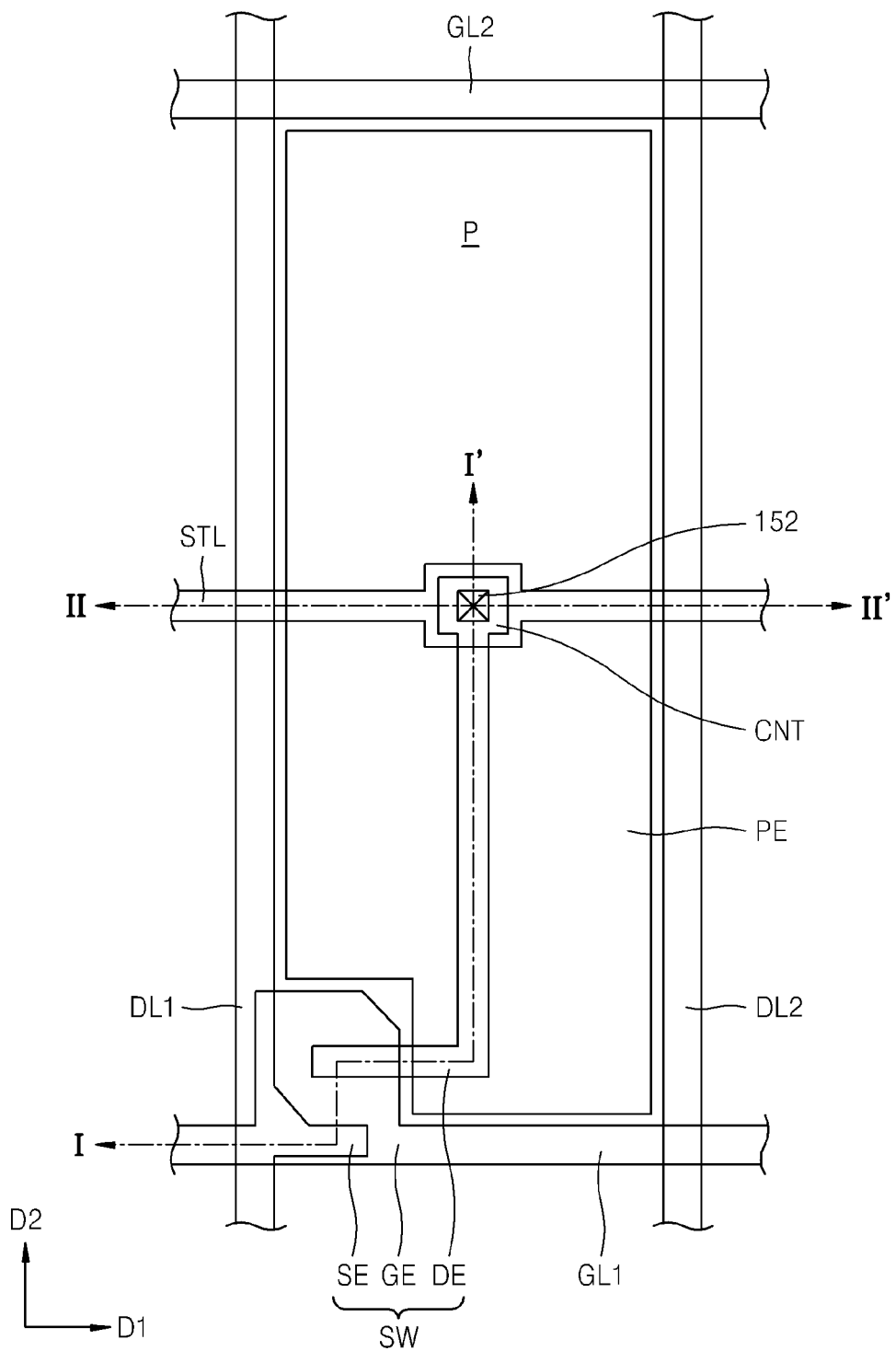
FIG. 1 is a plane view of a portion of a cell region of an embodiment of a liquid crystal display (LCD) device.
Figure 2A:
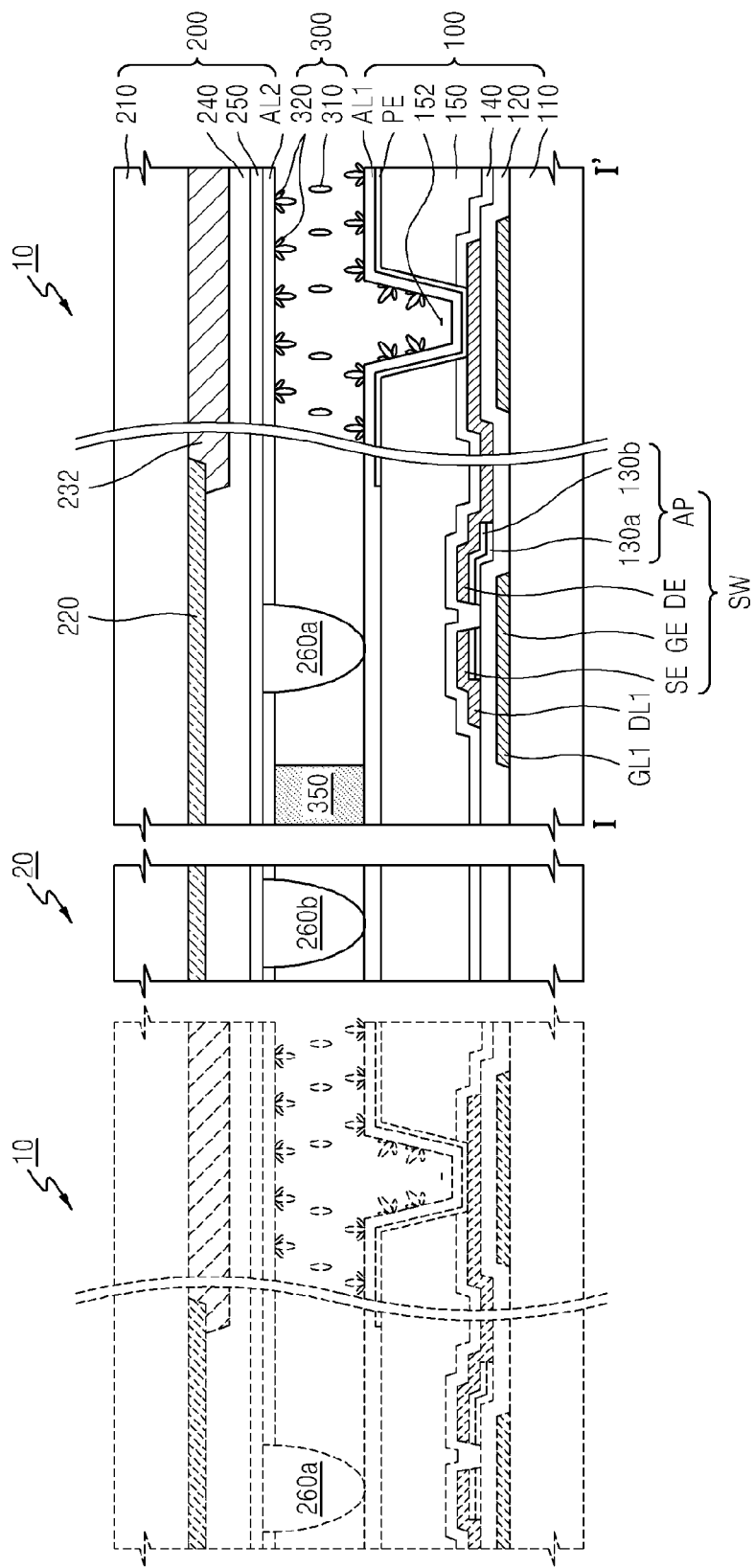
FIG. 2A is a cross-sectional view of the cell region of the embodiment of an LCD device shown in FIG. 1, taken along line I-I' of FIG. 1.

FIG. 1 is a plane view of a portion of a cell region of an embodiment of an LCD device. FIG. 2A is a cross-sectional view of the cell region of the embodiment of an LCD device shown in FIG. 1, taken along line I-I' of FIG. 1, and FIG. 2B is a cross-sectional view of the cell region of the embodiment of an LCD device shown in FIG. 1, taken along line II-II' of FIG. 1.

Figure 2B:
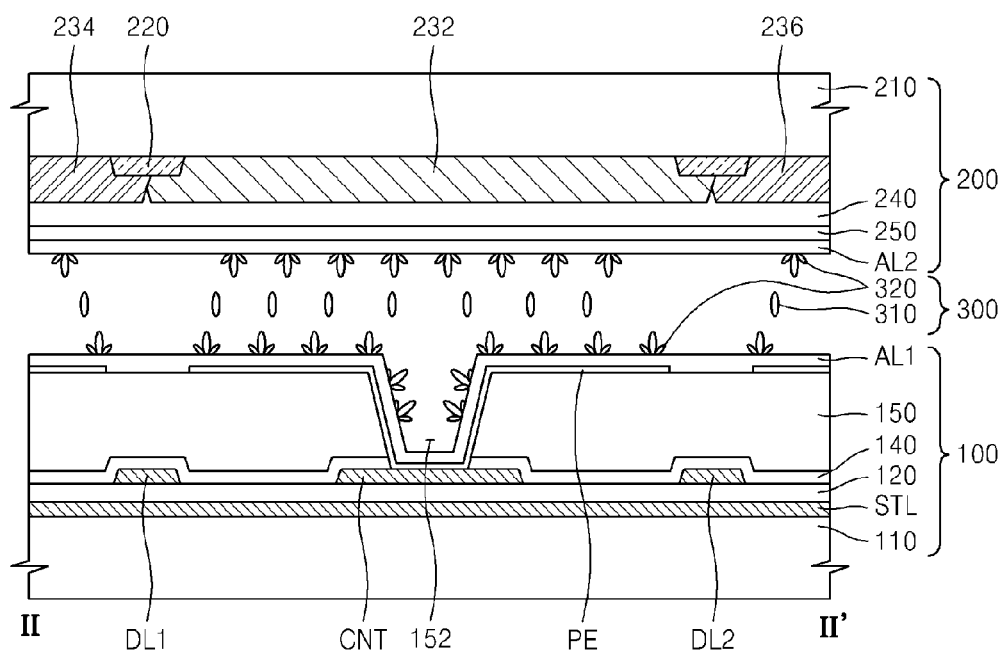
FIG. 2B is a cross-sectional view of the cell region of the embodiment of an LCD device shown in FIG. 1, taken along line II-II' of FIG. 1.

A liquid crystal layer in the cell region of FIGS. 2A and 2B includes liquid crystal molecules of a non-electric field in which a voltage is not applied between a pixel electrode and a common electrode, and has a reactive mesogen (RM) status. The RM is an ultraviolet ray reactive material or a composite thereof, and generates polymerization when the RM is exposed to ultraviolet rays. In FIG. 2A, a cell region 10 for forming a pixel and a cutting region 20, adjacent to the cell region 10, are illustrated. A plurality of the cell regions 10 respectively corresponding to product cells are formed in a mother substrate, and a cutting region 20 is formed between each of the cell regions 10. A portion indicated by dash lines in FIG. 2A corresponds to another cell region 10 that is adjacent to the cell region 10, with the cutting region 20 interposed therebetween. When a product cell is made, the cutting region 20 is cut, and thus a plurality of product cells are separated from the mother substrate.

Referring to FIGS. 1, 2A, and 2B, the cell region 10 of an embodiment of an LCD device includes a first substrate 100, a second substrate 200, and a liquid crystal layer 300.

In the embodiment shown, the first substrate 100 includes a first base substrate 110, first and second gate lines GL1 and GL2, a storage line STL, a gate insulating layer 120, first and second data lines DL1 and DL2, a thin film transistor SW that is a switching device, a passivation layer 140, a domain forming layer 150, a pixel electrode PE, and a first alignment layer AL1.

The first and second gate lines GL1 and GL2 may extend on the first base substrate 110 along a first direction D1. The first and second gate lines GL1 and GL2 may be arrayed in parallel to each other along a second direction D2 different from the first direction D1. In the embodiment shown, the second direction D2 is perpendicular to the first direction D1. The storage line STL may be disposed between the first and second gate lines GL1 and GL2, and may extend along the first direction D1. The gate insulating layer 120 is formed on the first base substrate 110 so as to cover the first and second gate lines GL1 and GL2, and the storage line STL. The first and second data lines DL1 and DL2 may extend on the gate insulating layer 120 along the second direction D2. The first and second data lines DL1 and DL2 may be arrayed in parallel to each other in the first direction D1. The first and second data lines DL1 and DL2 may cross the first and second gate lines GL1 and GL2, and the storage line STL, respectively. A pixel region P of the first substrate 100 may be defined by the first and second gate lines GL1 and GL2 and the first and second data lines DL1 and DL2, and the pixel electrode PE may be formed in the pixel region P.

The thin film transistor SW may include a gate electrode GE connected to the first gate line GL1, an active pattern AP formed on the gate insulating layer 120 so as to correspond to the gate electrode GE, a source electrode SE connected to the first data line DL1 and stacked on the active pattern AP, a drain electrode DE separate from the source electrode SE and stacked on the active pattern AP, and a contact electrode CNT extended from the drain electrode DE toward the pixel region P. The active pattern AP may include a semiconductor layer 130a and an ohmic contact layer 130b that are sequentially formed on the gate insulating layer 120. The contact electrode CNT is extended from the drain electrode DE to the storage line STL, and is overlapped with the storage line STL.

The passivation layer 140 may be formed on the gate insulating layer 120 so as to cover the first and second data lines DL1 and DL2, the source electrode SE, the drain electrode DE, and the contact electrode CNT.

The domain forming layer 150 may be formed on the passivation layer 140, and may planarize the first substrate 100. The domain forming layer 150 may include a depression pattern 152 that is formed by a depression from a surface of the domain forming layer 150 towards the passivation layer. The depression pattern 152 may be formed in the pixel region P, and may form a liquid crystal domain of the pixel region P.

The depression pattern 152 may be formed in the domain forming layer 150, as a dot type. The depression pattern 152 may be formed on the contact electrode CNT so as to correspond to the contact electrode CNT. The depression pattern 152 may be formed to have a dot type hole for exposing a portion of the contact electrode CNT. Although the depression pattern 152 has a hole form, due to the storage line STL and the contact electrode CNT that are formed below the depression pattern 152, it is possible to prevent light from penetrating through a region where the depression pattern 152 is formed. In some embodiments, the domain forming layer 150 may be formed of an organic material or an inorganic material. In other embodiments, the domain forming layer 150 may be formed of an organic layer and an inorganic layer, and the depression pattern 152 may be formed in the organic layer or the inorganic layer.

The pixel electrode PE is formed on the domain forming layer 150 in the pixel region P. The pixel electrode PE may be formed of a transparent and conductive material, and may entirely cover the depression pattern 152. The pixel electrode PE may be electrically connected to the thin film transistor SW by contacting the contact electrode CNT via the depression pattern 152. With respect to regions having the same planar areas, an area of the pixel electrode PE on the depression pattern 152 is relatively larger than an area of the pixel electrode PE formed on a flat region of the domain forming layer 150. In embodiments where an electric field is formed between the first substrate 100 and the second substrate 200, an intensity of the electric field in a region adjacent to the depression pattern 152 may be relatively greater than an intensity of the electric field in the flat region in which the depression pattern 152 is not formed.

The first alignment layer AL1 may be formed on a side of the first substrate 100 including the pixel electrode PE.

Still referring to FIGS. 2A and 2B, the second substrate 200 includes a second base substrate 210 facing the first substrate 100, a black matrix 220, first, second, and third color filters 232, 234, and 236, an overcoating layer 240, a common electrode 250, and a second alignment layer AL2. In some embodiments, the second substrate 200 may not include the overcoating layer 240.

The black matrix 220 may be formed on the second base substrate 210 so as to correspond to a non-pixel region in which the first and second gate lines GL1 and GL2, the first and second data lines DL1 and DL2, and the thin film transistor SW are formed. The first, second, and third color filters 232, 234, and 236 may be formed in regions of the second base substrate 210 defined by the black matrix 220. The first color filter 232 may be formed on the second base substrate 210 so as to correspond to the pixel region P on which the pixel electrode PE is formed. The second color filter 234 may be formed on one side of the first color filter 232, along the first direction D1, and the third color filter 236 may be formed on the other side of the first color filter 232, along the first direction D1. The overcoating layer 240 may be formed on the second base substrate 210 on which the black matrix 220, and the first, second, and third color filters 232, 234, and 236 are formed, and may planarize the second substrate 200.

The common electrode 250 may be formed on the overcoating layer 240. The common electrode 250 may be formed of a transparent and conductive material. The common electrode 250 may be formed on a front side of the second substrate 200 without being separately patterned. The liquid crystal domain of the liquid crystal layer 300 may be formed of the pixel electrode PE, which controls an intensity of an electric field via the depression pattern 152, and the common electrode 250 that is pattern-less.

In FIG. 2A, reference numeral 260a indicates a cell spacer formed as an organic insulator, and may be formed on the common electrode 250 by performing a photolithography process. In some embodiments, the cell spacer 260a may be directly formed on the common electrode 250, and in other embodiments another member may be interposed between the cell spacer 260a and the common electrode 250. The cell spacer 260a functions to maintain a gap between the first substrate 100 and the second substrate 200. In FIG. 2A, reference numeral 260b indicates a peripheral spacer formed as an organic insulator, in the cutting region 20, and may be simultaneously formed with the cell spacer 260a by performing a photolithography process. The cell spacer 260a and the peripheral spacer 260b may have substantially the same form. The peripheral spacer 260b in the cutting region 20 functions to prevent a short in the cutting region 20 during manufacturing.

The second alignment layer AL2 may be formed on the second base substrate 210 on which the common electrode 250 is formed. The second alignment layer AL2 may be formed on a front side of the second substrate 200 facing the first substrate 100.

Still referring to FIGS. 2A and 2B, the liquid crystal layer 300 is interposed in a space that is sealed by using a sealant 350 (see FIG. 2A) and is between the first substrate 100 and the second substrate 200. The liquid crystal layer 300 is formed of liquid crystal composition including liquid crystal molecules 310 and reactive mesogen polymer 320 (hereinafter, RM polymer 320).

The liquid crystal molecules 310 may adjust light transmittance. An array of the liquid crystal molecules 310 is changed according to an electric field formed between the pixel electrode PE and the common electrode 250. In some embodiments, the liquid crystal molecules 310 may have negative dielectric anisotropy.

Without voltage being applied between the pixel electrode PE and the common electrode 250, the liquid crystal molecules 310 adjacent to the first substrate 100 and/or the second substrate 200 may be arrayed in such a manner that a long axis of the liquid crystal molecules 310 may be in a vertical direction to a surface of the first base substrate 110 and/or a surface of the second base substrate 210. A long axis of the liquid crystal molecules 310 adjacent to the depression pattern 152 may be arrayed in a vertical direction to a surface of a sidewall of the domain forming layer 150 in which the depression pattern 152 is formed.

The RM polymer 320 may be interposed between each of the liquid crystal molecules 310. The RM polymer 320 may be interposed between each of the liquid crystal molecules 310 adjacent to the pixel electrode PE and/or the common electrode 250. The RM polymer 320 may be interposed between each of the liquid crystal molecules 310 adjacent to the first alignment layer AL1. The RM polymer 320 may also be interposed between each of the liquid crystal molecules 310 adjacent to the second alignment layer AL2.

Even if an electric field is not applied between the pixel electrode PE and the common electrode 250, the RM polymer 320 may allow the liquid crystal molecules 310 to be pre-tilted with respect to the surface of the first base substrate 110 and/or the surface of the second base substrate 210, wherein the liquid crystal molecules 310 are adjacent to the first substrate 100 and/or the second substrate 200. The RM polymer 320 may be formed by RM monomers 330 (refer to FIG. 3E) being polymerized by performing an ultraviolet ray exposure during an LCD device manufacturing method.

With ultraviolet rays irradiated to the RM monomers 330, the RM monomers 330 are polymerized as the RM polymer, and then the RM polymer and the liquid crystal molecules 310 are attached to the pixel electrode PE and the common electrode 250, so that the liquid crystal molecules 310 may maintain their pre-tilted status. The ultraviolet irradiation may include an electric field exposure process in which the ultraviolet rays are irradiated when there is a voltage difference is between the pixel electrode PE and the common electrode 250, and a non-electric field exposure process in which ultraviolet rays having a high energy are irradiated when a voltage is not applied to the pixel electrode PE and the common electrode 250.

With a voltage applied to the pixel electrode PE and the common electrode 250 in the electric field exposure process, a short may occur if the pixel electrode PE and the common electrode 250 contact each other. In particular, since an LCD device is to be manufactured in the cell region 10, the cell spacer 260a is generally formed in the cell region 10 so as to stably maintain the gap between the first substrate 100 and the second substrate 200. Generally, since the cutting region 20 is cut during the manufacturing process, a peripheral spacer 260b in the cutting region 20 is not generally used. However, where final products are manufactured in mother substrate units, the cutting region 20 and the cell region 10 are connected until the cutting region 20 is finally cut, such that a short in the cutting region 20 may damage the adjacent cell region 10. Thus, by forming the peripheral spacer 260b in the cutting region 20, an unexpected short during the manufacturing process may be prevented.

Figure 2C:
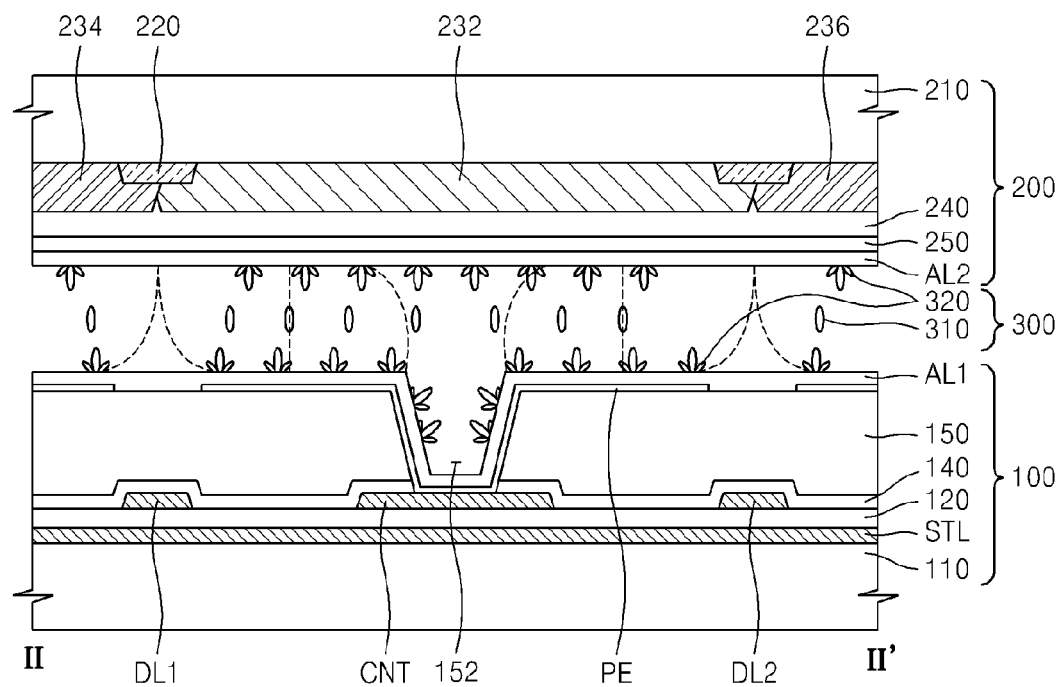
FIG. 2C is a cross-sectional view of the embodiment of the LCD device shown in FIG. 2B, to which a voltage is applied.

FIG. 2C is a cross-sectional view of the embodiment of the LCD device shown in FIG. 2B, to which a voltage is applied.

Referring to FIG. 2C, with an electric field formed between the pixel electrode PE and the common electrode 250, the electric field in the pixel region P is in a vertical direction to the surface of the first base substrate 110 and/or the surface of the second base substrate 210.

A direction of the electric field is curved between an end of the pixel electrode PE and the common electrode 250. The direction of the electric field is also curved between the common electrode 250 and an end of a pixel electrode that is adjacent to the pixel electrode PE. The liquid crystal domain between the adjacent pixel regions P may thus be divided.

The electric field adjacent to the depression pattern 152 may have a shape converged on a point of the common electrode 250. The point may correspond to the depression pattern 152, due to a pre-tilt by sidewalls of the depression pattern 152. Accordingly, without forming a pattern in the common electrode 250, it is possible to form the cell region 10 having the liquid crystal domain formed therein.

The cutting region 20 indicates a temporary connection region that is positioned between each of the cell regions 10 since LCD devices are generally not manufactured in cell product units but rather in mother substrate units, each of which includes several cell products. The cutting region 20 is cut at a later time when the mother substrate is divided into cell product units.

A short may occur in the cutting region 20 when voltage is applied to the pixel electrode PE and the common electrode 250 in the electric field exposure process during manufacturing, and the short may damage the cell region 10. As illustrated in FIG. 2A, the first and second substrates 100 and 200 extend to the cutting region 20, the second substrate 200 includes the common electrode 250, and the first substrate 100 includes the pixel electrode PE. The pixel electrode PE is formed in the pixel region P in the cell region 10, but the first alignment layer AL1 formed thereon is a conductive member, such that the pixel electrode PE and the common electrode 250 may directly contact in the cutting region 20 when the voltage is applied to the pixel electrode PE and the common electrode 250. Furthermore, since the liquid crystal layer 300 is interposed between the first and second substrates 100 and 200 in the cell region 10, there is a possibility that the pixel electrode PE and the common electrode 250 directly contact each other.

Due to the gap between the first 100 and second 200 substrates in the cutting region 20, there is a possibility of a short due to direct contact between the pixel electrode PE and the common electrode 250. If a short occurs, an electrical structure of the cell regions 10 around the short may be damaged, and the damaged cell regions 10 are defective products that cannot be used as product cells.

Accordingly, as illustrated in FIG. 2A, a cell spacer 260a and a peripheral spacer 260b, which are both insulators, may be interposed between the first and second substrates 100 and 200. The cell spacer 260a and the peripheral spacer 260b may be formed on the common electrode 250 by performing the photolithography process.

The cell spacer 260a and the peripheral spacer 260b may be formed in both the cell region 10 and the cutting region 20. The spacers 260a and 260b may maintain a cell gap between the first and second substrates 100 and 200, and they may prevent shorts from occurring in the cutting region 20. Thus, by forming the peripheral spacer 260 bin the cutting region 20, a short may be prevented during manufacturing and product defect rate may thus be reduced.

FIGS. 3A through 3E are cross-sectional views illustrating an embodiment of a method of manufacturing the embodiment of an LCD device of FIG. 1.

Figure 3A:
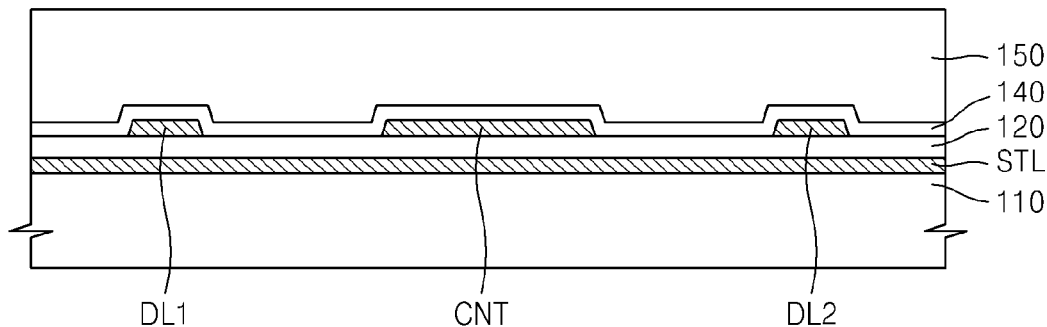
FIGS. 3A through 3E are cross-sectional views illustrating an embodiment of a method of manufacturing the embodiment of an LCD device of FIG. 1.
Figure 3B:
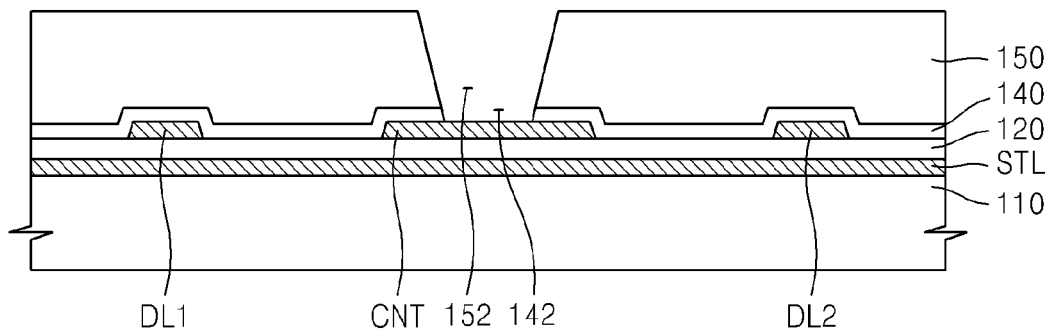
Figure 3C:
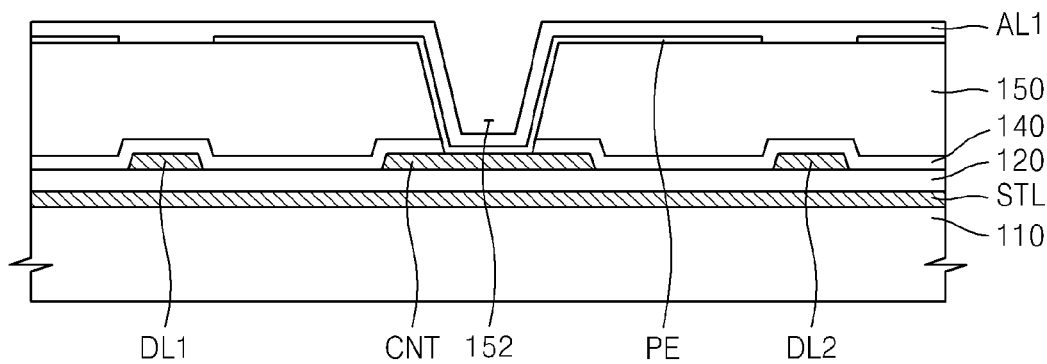

FIGS. 3A through 3E are diagrams corresponding to cross-sections of the LCD device in each manufacturing process, taken along line II-IF in FIG. 1. FIGS. 3A through 3C are cross-sectional views illustrating an embodiment of a method of manufacturing the first substrate 100.

Referring to FIG. 3A, a gate metal layer (not shown) is formed on the first base substrate 110, and the gate metal layer is patterned by performing a photolithography process so that a gate pattern including the first and second gate lines GL1 and GL2, the gate electrode GE, and the storage line STL is formed.

The gate insulating layer 120 is formed on the first base substrate 110 on which the gate pattern is formed. In some embodiments, the gate insulating layer 120 may be formed of a material including silicon oxide, silicon nitride, and the like.

The active pattern AP is formed on the first base substrate 110 on which the gate insulating layer 120 is formed. The semiconductor layer 130a and the ohmic contact layer 130b may be formed on the gate insulating layer 120. The semiconductor layer 130a may include amorphous silicon, and the ohmic contact layer 130b may include amorphous silicon highly doped with n-type impurities.

A data metal layer (not shown) is formed on the first base substrate 110 on which the active pattern AP is formed, and patterned by performing a photolithography process to form a source pattern including the first and second data lines DL1 and DL2, the source electrode SE, the drain electrode DE, and the contact electrode CNT.

The passivation layer 140 and the domain forming layer 150 are formed on the first base substrate 110 on which the source pattern is formed. In some embodiments, the passivation layer 140 may be formed of a material including silicon oxide, silicon nitride, and the like. In some embodiments, the domain forming layer 150 may be formed of a material including a positive-type photoresist composition or negative-type photoresist composition, or an inorganic material such as silicon oxide, silicon nitride, and the like.

Referring to FIG. 3B, the depression pattern 152 is formed by patterning the domain forming layer 150. The depression pattern 152 may be formed on the contact electrode CNT. The contact electrode CNT may overlap the storage line STL. The depression pattern 152 may be formed as a hole for exposing the passivation layer 140 on the contact electrode CNT.

A passivation hole 142 is formed by removing the passivation layer 140 exposed via the depression pattern 152. The passivation hole 142 is formed in the contact electrode CNT. The portion of the contact electrode CNT may be exposed via the passivation hole 142 and the depression pattern 152.

Referring to FIG. 3C, a transparent electrode layer (not shown) is formed on the first base substrate 110 including the domain forming layer 150 having the depression pattern 152 formed therein, and the transparent electrode layer is patterned to form the pixel electrode PE. In some embodiments, the transparent electrode layer may be formed of a material including indium tin oxide (ITO), indium zinc oxide (IZO), and the like.

The first alignment layer AL1 is formed on the first base substrate 110 on which the pixel electrode PE is formed. The first alignment layer AL1 may include a vertical alignment material capable of vertically aligning the liquid crystal molecules 310.

Figure 3D:
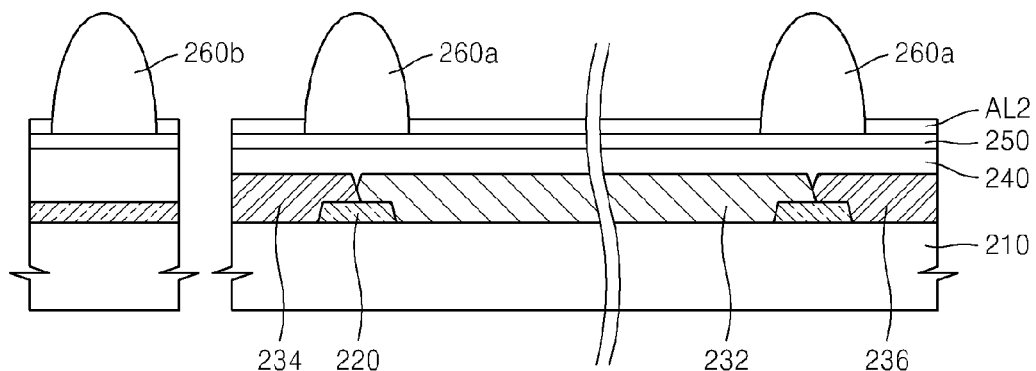

FIG. 3D is a cross-sectional view illustrating an embodiment of a method of manufacturing the second substrate 200.

Referring to FIG. 3D, the black matrix 220 is formed on the second base substrate 210. The black matrix 220 may be formed by spraying an organic ink, or a metal layer is patterned by performing a photolithography process. The black matrix 220 is formed between the first, second, and third color filters 232, 234, and 236, and an edge portion corresponding to an edge of the screen of the display.

The first, second, and third color filters 232, 234, and 236 are formed on the second base substrate 210 on which the black matrix 220 is formed. In one embodiment, the first color filter 232 may be formed, the second color filter 234 may be formed on the second base substrate 210 including the first color filter 232, and the third color filter 236 may be formed on the second base substrate 210 including the first color filter 232 and the second color filter 234. The first, second, and third color filters 232, 234, and 236 may be formed by patterning a color photoresist layer by performing a photolithography process, or by spraying color ink.

The overcoating layer 240 may be formed on the second base substrate 210 including the black matrix 220, and the first, second, and third color filters 232, 234, and 236. In one embodiment, a material for forming the overcoating layer 240 may include acryl resin.

The common electrode 250 may be formed by forming a transparent electrode (not shown) on the second base substrate 210 on which the overcoating layer 240 is formed. The common electrode 250 may be formed to cover an entire surface of the second base substrate 210 without a process for patterning the transparent electrode. In some embodiments, the common electrode 250 may be formed with a material including ITO, IZO, and the like.

The cell spacer 260a, which is an insulator, may be formed on the common electrode 250 by performing a photolithography process. The peripheral spacer 260b in the cutting region 20 may be formed to have the same material and form as the cell spacer 260a.

The second alignment layer AL2 may be formed on the second base substrate 210 on which the common electrode 250 is formed. The second alignment layer AL2 may cover an entire surface of the second base substrate 210 on which the common electrode 250 is formed.

Figure 3E:
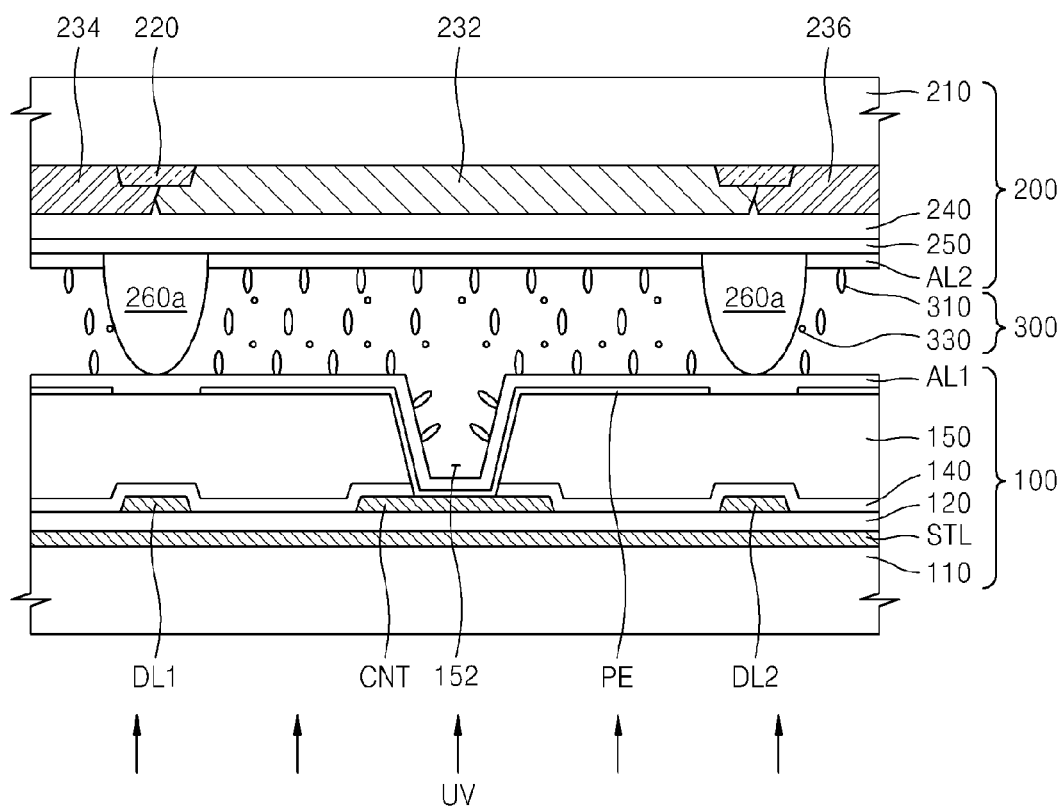

FIG. 3E is a cross-sectional view illustrating an embodiment of an exposure process for forming the liquid crystal layer 300.

Referring to FIG. 3E, the first substrate 100 and the second substrate 200 are sealed together. The liquid crystal molecules 310 and the RM monomers 330 may be interposed between the first substrate 100 and the second substrate 200. The liquid crystal molecules 310 and the RM monomers 330 may be interposed between the first substrate 100 and the second substrate 200.

A first voltage Vcom may be applied to the common electrode 250, and a second voltage Vdata, different from the first voltage Vcom, may be applied to the pixel electrode PE. An electric field may thus be formed between the pixel electrode PE and the common electrode 250. Consequently, a long axis of the liquid crystal molecules 310 may be directed in a vertical direction to a direction of the electric field.

The first voltage, Vcom, may be higher than the second voltage, Vdata. In some embodiments, the first voltage Vcom may be about 0V, and the second voltage Vdata may have a negative value. In one embodiment, the second voltage Vdata may be about −5V.

With an electric field formed between the first substrate 100 and the second substrate 200 so that the liquid crystal molecules 310 are pre-tilted, light is irradiated to the first substrate 100 and the second substrate 200; an electric field exposure process is performed. In some embodiments, the light may be ultraviolet rays. Due to the light, the RM monomers 330 are photo-reacted and are polymerized, so that the RM polymer 320 interposed between the liquid crystal molecules 310 may be formed.

The RM polymer 320 and the liquid crystal molecules 310 attach to the pixel electrode PE and the common electrode 250, so that the liquid crystal molecules 310 may maintain their pre-tilted status. With a voltage applied to the pixel electrode PE and the common electrode 250, a short may occur if the pixel electrode PE and the common electrode 250 contact each other. However, since the cell spacer 260a and the peripheral spacer 260b maintain a gap between the first substrate 100 and the second substrate 200 in both of the cell region 10 and the cutting region 20, the short is prevented. A non-electric field exposure process, in which an electric field is not applied, is performed so that the liquid crystal domain is completely settled down.

With the gap between the first substrate 100 and the second substrate 200 maintained by the cell spacer 260a and the peripheral spacer 260b while the voltage is applied to the pixel electrode PE and the common electrode 250, a potential short in the cutting region 20 may be prevented, and thus a product defect rate may be reduced.

According to some embodiments, it is possible to form the liquid crystal domain due to the depression pattern 152 of the domain forming layer 150 without performing a separate pattern in the common electrode 250. Since the common electrode 250 does not have the separate pattern, a cause of misalignment with respect to the first substrate 100 and the second substrate 200 may be removed, and since a separate patterning process for patterning the common electrode 250 is omitted, the manufacturing method may be simplified. A potential short is also prevented by forming the peripheral spacer 260b in the cutting region 20, and thus the product defect rate may be reduced.

In some embodiments, the peripheral spacer 260b in the cutting region 20 has the same form as the cell spacer 260a in the cell region 10, so that both ends of each of the cell spacer 260a and the peripheral spacer 260b contact the first substrate 100 and the second substrate 200.

Figure 4:
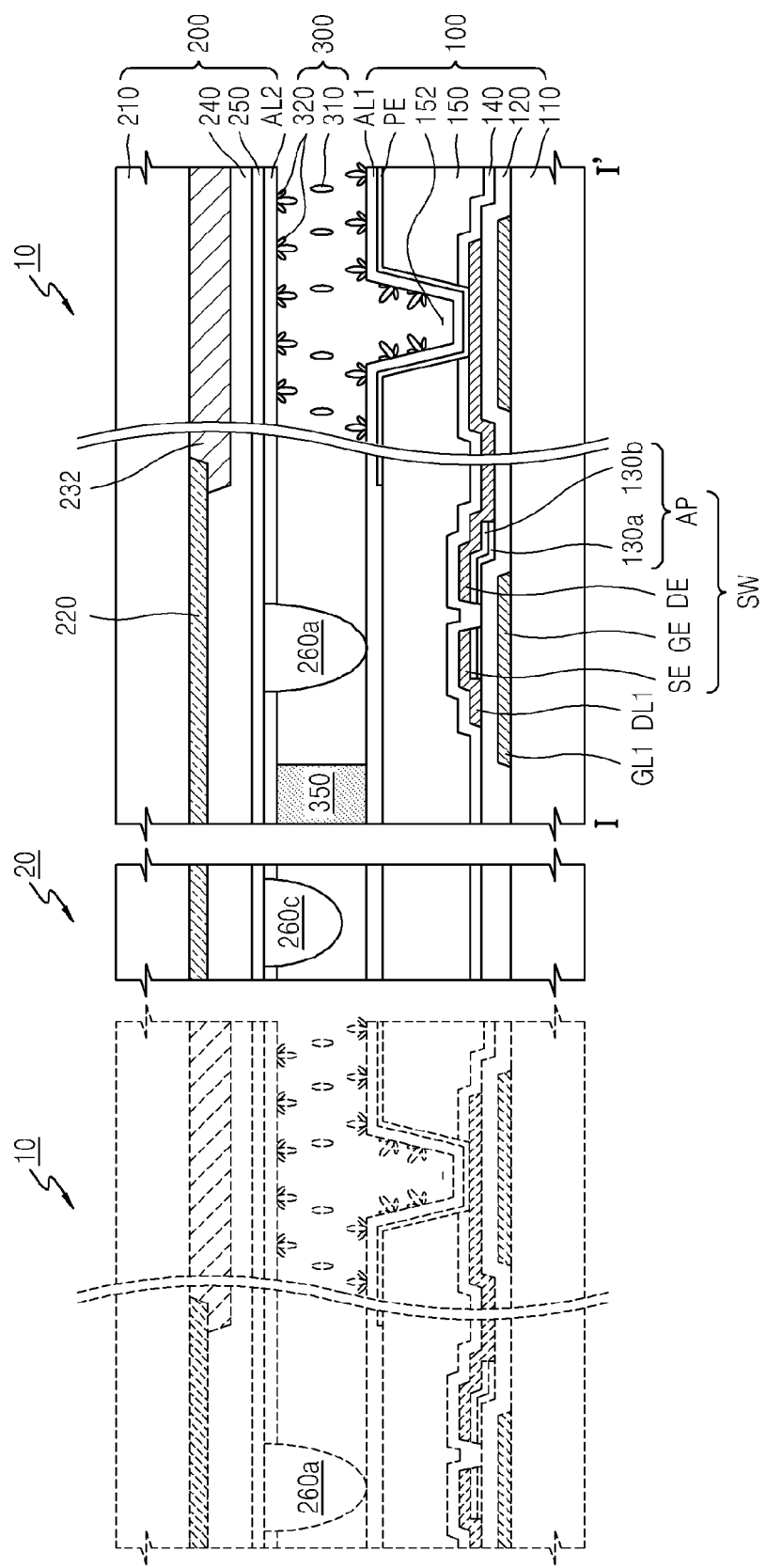
FIG. 4 is a cross-sectional view of the cell region of another embodiment of an LCD device.

In other embodiments, such as the one illustrated in FIG. 4, a peripheral spacer 260c may be formed to contact only the second substrate 200. Since the peripheral spacer 260c in the cutting region 20 functions to prevent a contact between the first substrate 100 and the second substrate 200 when an electric field exposure process is performed, it may not be necessary to form the peripheral spacer 260c so as to maintain a constant gap between the first substrate 100 and the second substrate 200, like the cell spacer 260a in the cell region 10. Thus, as illustrated in the embodiment of FIG. 4, the peripheral spacer 260c may be formed with a length that is less than a length of the cell spacer 260a in the cell region 10, while still preventing contact between the first substrate 100 and the second substrate 200 in the cutting region 20.

As described above, embodiments of a method of manufacturing the LCD device may form the liquid crystal domain without forming the separate pattern in the common electrode, and may also prevent a risk of a short in the cutting region.

It should be understood that the exemplary embodiments described herein should be considered in a descriptive sense only and not for purposes of limitation. Descriptions of features or aspects within each embodiment should be considered as available for other similar features or aspects in other embodiments.

What is claimed is:

1. A liquid crystal display (LCD) device comprising:
   a plurality of cell regions comprising a first substrate whereon a pixel electrode is formed, a second substrate whereon a common electrode is formed, and a liquid crystal layer interposed between the first substrate and the second substrate, wherein the first substrate comprises a depression pattern for forming a liquid crystal domain, and wherein the liquid crystal layer comprises liquid crystal molecules for forming the liquid crystal domain, and RM polymer for fixing the liquid crystal molecules due to the depression pattern; and
   a cutting region formed between the plurality of cell regions, and comprising the first substrate and the second substrate extended from the plurality of cell regions, and at least one peripheral spacer interposed between the first substrate and the second substrate, wherein the peripheral spacer contacts at least one of the first and second substrates.

2. The LCD device of claim 1, wherein the at least one peripheral spacer is configured to maintain a cell gap between the first substrate and the second substrate in the cutting region, to prevent an electrical short in the pixel electrode and the common electrode.

3. The LCD device of claim 1, wherein the RM polymer is formed in a manner that RM monomers are polymerized by performing an ultraviolet ray exposure, and the ultraviolet ray exposure comprises an electric field exposure process in which an exposure process is performed when a voltage is applied to the pixel electrode and the common electrode, and a non-electric field exposure process in which an exposure process is performed when a voltage is not applied to the pixel electrode and the common electrode.

4. The LCD device of claim 1, wherein the common electrode does not have a pattern for forming the liquid crystal domain.

5. The LCD device of claim 1, wherein a cell spacer is formed in each of the plurality of cell regions.

6. The LCD device of claim 5, wherein the cell spacer has the same form and comprises the same material as the at least one peripheral spacer.

7. The LCD device of claim 1, wherein the cell spacer and the at least one peripheral spacer are insulators.

8. A method of manufacturing a liquid crystal display (LCD) device, the method comprising:
    manufacturing a first substrate comprising a pixel electrode;
    manufacturing a second substrate comprising a common electrode facing the pixel electrode;
    forming a plurality of cell regions between the first substrate and the second substrate, wherein the plurality of cell regions are sealed by using a sealant;
    forming a cell spacer in each of the plurality of cell regions;
    forming a liquid crystal layer in the plurality of cell regions; and
    forming at least one peripheral spacer interposed between the first substrate and the second substrate, in a cutting region between the plurality of cell regions, wherein the at least one peripheral spacer contacts at least one of the first and second substrates, wherein the at least one peripheral spacer is configured to maintain a cell gap between the first substrate and the second substrate in the cutting region to prevent an electrical short in the pixel electrode and the common electrode, and wherein the liquid crystal layer is radiated with ultraviolet rays when there is a voltage difference between the pixel electrode and the common electrode.

9. The method of claim 8, wherein the liquid crystal layer comprises an ultraviolet ray reactive material or a composite thereof.

10. The method of claim 9, wherein the ultraviolet ray reactive material comprises reactive mesogen (RM).

11. The method of claim 8, wherein the first substrate comprises a depression pattern for forming a liquid crystal domain.

12. The method of claim 8, wherein the common electrode does not have a pattern for forming a liquid crystal domain.

13. The method of claim 8, wherein the cell spacer and the at least one peripheral spacer are formed to have the same form and to comprise the same insulating material.

14. A method of manufacturing a liquid crystal display (LCD) device, the method comprising:
    manufacturing a first substrate comprising a pixel electrode;
    manufacturing a second substrate comprising a common electrode facing the pixel electrode;
    forming a plurality of cell regions between the first substrate and the second substrate, wherein the plurality of cell regions are sealed by using a sealant;
    forming a cell spacer in each of the plurality of cell regions;
    forming a liquid crystal layer in the plurality of cell regions, wherein the forming of the liquid crystal layer comprises:
        interposing a liquid crystal composition in the plurality of cell regions; and
        exposing the liquid crystal composition with ultraviolet rays, wherein the liquid crystal composition comprises liquid crystal molecules and reactive mesogen (RM) monomers, wherein exposing the liquid crystal composition with ultraviolet rays polymerizes the RM monomers as mesogen polymers, and arrays the liquid crystal molecules by forming a liquid crystal domain along the depression pattern; and
    forming at least one peripheral spacer interposed between the first substrate and the second substrate, in a cutting region between the plurality of cell regions.

15. The method of claim 14, wherein exposing the liquid crystal composition with ultraviolet rays comprises:
    an electric field exposure process in which a voltage is applied to the pixel electrode and the common electrode; and
    a non-electric field exposure process in which a voltage is not applied to the pixel electrode and the common electrode.

* * * * *